United States Patent [19]

Reunamäki et al.

[11] Patent Number: 4,816,055
[45] Date of Patent: Mar. 28, 1989

[54] METHOD OF AND APPARATUS FOR CARRYING GLASS SHEETS DURING HEATING AND TEMPERING

[75] Inventors: Pauli T. Reunamäki; Arto O. Jantunen, both of Tampere, Finland

[73] Assignee: Kyro A/B Tamglass, Tampere, Finland

[21] Appl. No.: 99,734

[22] Filed: Sep. 22, 1987

[30] Foreign Application Priority Data

Sep. 22, 1986 [FI] Finland .................................. 863827

[51] Int. Cl.$^4$ ............................................. C03B 27/04
[52] U.S. Cl. ........................................ 65/114; 65/163; 65/273; 65/349; 65/351
[58] Field of Search ............... 65/163, 273, 349, 351, 65/DIG. 13, 114

[56] References Cited

U.S. PATENT DOCUMENTS

| | | |
|---|---|---|
| 1,856,669 | 5/1932 | Sylvester . |
| 2,140,282 | 12/1938 | Drake . |
| 3,672,861 | 6/1972 | Ritter, Jr. et al. . |
| 3,792,993 | 2/1974 | Artama et al. ........................ 65/163 |
| 3,994,711 | 11/1976 | McMaster ............................ 65/163 |
| 4,617,043 | 10/1986 | Reunamäki ....................... 65/349 X |

FOREIGN PATENT DOCUMENTS 704219 3/1941 Fed. Rep. of Germany .

Primary Examiner—Arthur Kellogg
Attorney, Agent, or Firm—Burns, Doane, Swecker & Mathis

[57] ABSTRACT

The invention relates to a method of carrying glass sheets during heating and tempering as well as to a tempering apparatus for glass sheets, in which the method is applied. During heating, glass sheets are oscillated in a furnace (2) back and forth in a manner that the traveling distance forward on at least some of the reciprocating strokes is longer than the traveling distance backwards, whereby the transportation of each load of glass sheets from the upstream end of a furnace to the downstream end of a furnace occurs by means of the combined effect of several forward-directed long strokes. Shifting of a load of glass sheets from furnace into tempering section is effected by extending the forward-directed stroke of a load of glass sheets at the downstream end of said furnace while at the same time other loads of glass sheets in the furnace reverse for a backwards-directed stroke. Therefore, the downstream end of a furnace is provided with an intermediate conveyor (8), adapted to travel along with furnace conveyor (7) or tempering section conveyor (9) depending on which one of said conveyors (7 or 9) has a greater speed.

4 Claims, 4 Drawing Sheets

METHOD OF AND APPARATUS FOR CARRYING GLASS SHEETS DURING HEATING AND TEMPERING

The present invention relates to a method of and an apparatus for carrying glass sheets during heating and tempering.

The continuous-action methods and apparatus, whereby successive loads of glass sheets are carried continuously and nonstop in one direction (e.g. U.S. Pat. No. 3,672,861), achieve a great production capacity but such equipment will be very long and expensive. A restriction to their application is that they are economically feasibly only for the production of large series of identical glass sheets. Their re-arrangement for lesser series is too slow and tedious an operation which would decrease production capacity and make it economically unfeasible.

For the production of smaller series there is a method and apparatus for moving back and forth or oscillating glass sheets both in the furnace and in the tempering section (e.g. DE Patent specification No. 704 219).

The heating time in a furnace is dozens of times longer than what is required for tempering. The actual tempering must still be followed by annealing until the glass sheet temperature is sufficiently low for it to be carried to an unloading section. When tempering and annealing have been effected in one and the same tempering section, it has become possible to use this combined tempering and annealing section for a combined tempering and annealing action during the time a load of glass sheets is heated in the furnace. However, the power consumption of a tempering section per unit of length during a tempering process is constant and independent of the degree of filling (it is surface area of glass load to be tempered per available surface area) and it requires structures, whose share of the manufacturing costs of a tempering plant is very high indeed. Still, it is only used for actual tempering just a fraction of the overall time. Thus, this expensive and highly energy-consuming investment is in a relatively ineffective use. The same problem is apparent also in the apparatus set forth in U.S. Pat. No. 3,994,711, wherein an individual load of glass sheets oscillates from one end of a furnace to the other while another load of glass sheets is being tempered and annealed in a tempering section. The advancement of glass sheets from furnace to tempering section is effected during an index cycle, with all furnace rollers being rotationally driven for carrying a load of heated glass sheets out of a furnace and into a tempering section. Thus, during this index cycle, the furnace conveyor drive mechanism is coupled with the tempering section roller conveyor for providing the co-ordinated transfer of a load of glass sheets from furnace to tempering section. At the same time, a fresh load of glass sheets can be passed into the furnace, whereafter the respective conveyors of furnace and tempering section are coupled off and said fresh load of glass sheets advanced into the furnace is set to oscillate from one end of the furnace to the other. Due to this batch operation, the capacity of such apparatus is relatively modest. In view of this modest capacity, however, the apparatus is not optimal in construction as a result of the following facts. The lenght of a furnace is relatively great compared to the length of a load of glass sheets and considering that just one load of glass sheets at a time is heated in the furnace. The use of a tempering section also for annealing means that the expensive tempering section is in inefficient use. The synchronization of the respective conveyors of furnace and tempering section to the same speed during an index cycle is difficult to perform and requires expensive control systems.

U.S. Pat. No. 2,140,282 discloses an apparatus, wherein loads of glass sheets in a furnace travel nonstop in one direction while a load of glass sheets in a tempering section is oscillated. Thus, it has been possible to make the tempering section short but the furnace is disproportionately long and expensive in view of the capacity of such apparatus, which is restricted by the fact that tempering and annealing are effected in one and the same section in batch operation. This requires that a large space be left in the furnace between the glass sheets, so that the preceding one has time to oscillate in the tempering and annealing section.

U.S. Pat. No. 1,856,669 discloses how to shorten the length of a chilling chamber employed in the production of glass by adapting the conveyor rollers to oscillate in a manner that an oscillating stroke in the traveling direction is slightly longer than an oscillating stroke in the return direction. In the production chilling of glass, such a semi-continuous advancement has been possible because, at the end of the forward travel, a chilled glass sheet can be moved over onto an unloading conveyor without problems. On the other hand, the transfer of a glass sheet heated in a furnace near its softening point from furnace to tempering section is not possible with today's conveying equipment and methods if a furnace contains a plurality of loads of glass sheets at different stages of heated, whose advancement occurs semi-continuously or in an oscillating fashion so that a forward-directed conveying stroke is longer than a backwards-directed stroke.

An object of the invention is to provide a method and apparatus for carrying glass sheets during heating and tempering so as to achieve a medium production capacity with equipment whose costs per unit produced are less than before.

A second object of the invention is to provide a method and apparatus which facilitate the optimal exploitation of a furnace and a tempering section with a medium production capacity while maintaining a possibility of a quick change-over between different types of production series the same way as in smaller-capacity oscillating tempering equipment.

A third object of the invention is to provide a simple, inexpensive and reliable apparatus for carrying a first load of glass sheets in a heating furnace into a tempering section while continuing the heating and oscillating of other loads of glass sheets in the furnace independent of said transfer into the tempering section.

A fourth object of the invention is to provide a method and apparatus for carrying a first load of glass sheets in a heating furnace into a tempering section by continuing in a stepless fashion the forwarding motion starting during an oscillating cycle, whereby the last stopping moment of a load of glass sheets is temporally as far away as possible from the exit moment of a load of glass sheets. Thus, the temperature of a load of glass is as cold as possible during the last stopping moment.

A fifth object of the invention is to provide a glass sheets tempering apparatus, whose furnace length and, accordingly, production capacity can be readily increased while minimizing the production down-times caused by the furnace maintenance.

The characterizing features for achieving these objects of the invention are set forth in the annexed claims.

In order to dimension a heating furnace as short as possible and to make it operate with a medium production capacity, said furnace contains at short mutual distances a plurality of glass sheet loads at different stages of heating. This batch of glass sheet loads is oscillated back and forth in the furnace in a manner that, at least one some of the reciprocating strokes, the traveling distance forward is longer than backward. Thus, the transportation of each individual load of glass sheets from the upstream to the downstream end of a furnace is achieved by the combined effect of several forward-directed long strokes.

The transfer of a load of sheets from furnace into tempering section is performed by extending the forward-directed stroke of a load of glass sheets at the downstream end of a furnace while, at the same time, other loads of glass sheets in the furnace reverse to effect a backward-directed stroke. This is only possible by fitting the downstream end of a furnace with an intermediate conveyor of the invention, which is independent of the actual furnace conveyor. The drive of this intermediate conveyor has been achieved without its own drive motor simply by using a first coupling for driving it back and forth along with the furnace conveyor and, in addition, it is provided with a first one-way transmission element for coupling it to run along with the actual furnace conveyor in one direction only, said intermediate conveyor traveling along with the furnace conveyor in just one direction when the first coupling is opened and, simultaneously, the intermediate conveyor is, by means of a second coupling and its associated second one-way transmission element, connectable so as to be driven along with the tempering section conveyor in just one direction. Thus, the intermediate conveyor is first synchronized with the furnace conveyor for moving a load of glass sheets onto the intermediate conveyor. Thereafter, the intermediate conveyor is still synchronized with the furnace conveyor, but only in one direction whereby, with the speed of a furnace conveyor decelerating, there will be a situation where the speed of a tempering section conveyor for an instant matches the speed of a furnace conveyor and at that instant the drive of said intermediate conveyor shifts over to the tempering section conveyor. Hence, the conveyors of a furnace and a tempering section are in no time coupled together for a mutually co-ordinated advancing cycle. This offers the advantage that a tempering section conveyor coupled only to an intermediate conveyor is capable of effecting a quicker shifting stroke, it can be accelerated quicker than what would be possible if it was coupled to the furnace conveyor. This quicker shifting speed also adds on its part to the capacity of such apparatus and improves the optical quality of tempered glass and decreases tempering losses.

The invention will now be described in more detail with reference made to the accompanying drawings, in which FIG. 1 is a diagrammatic side view of an apparatus of the invention and below the apparatus are depicted the movements of a load of glass sheets in place and time coordinates.

Figure 1:
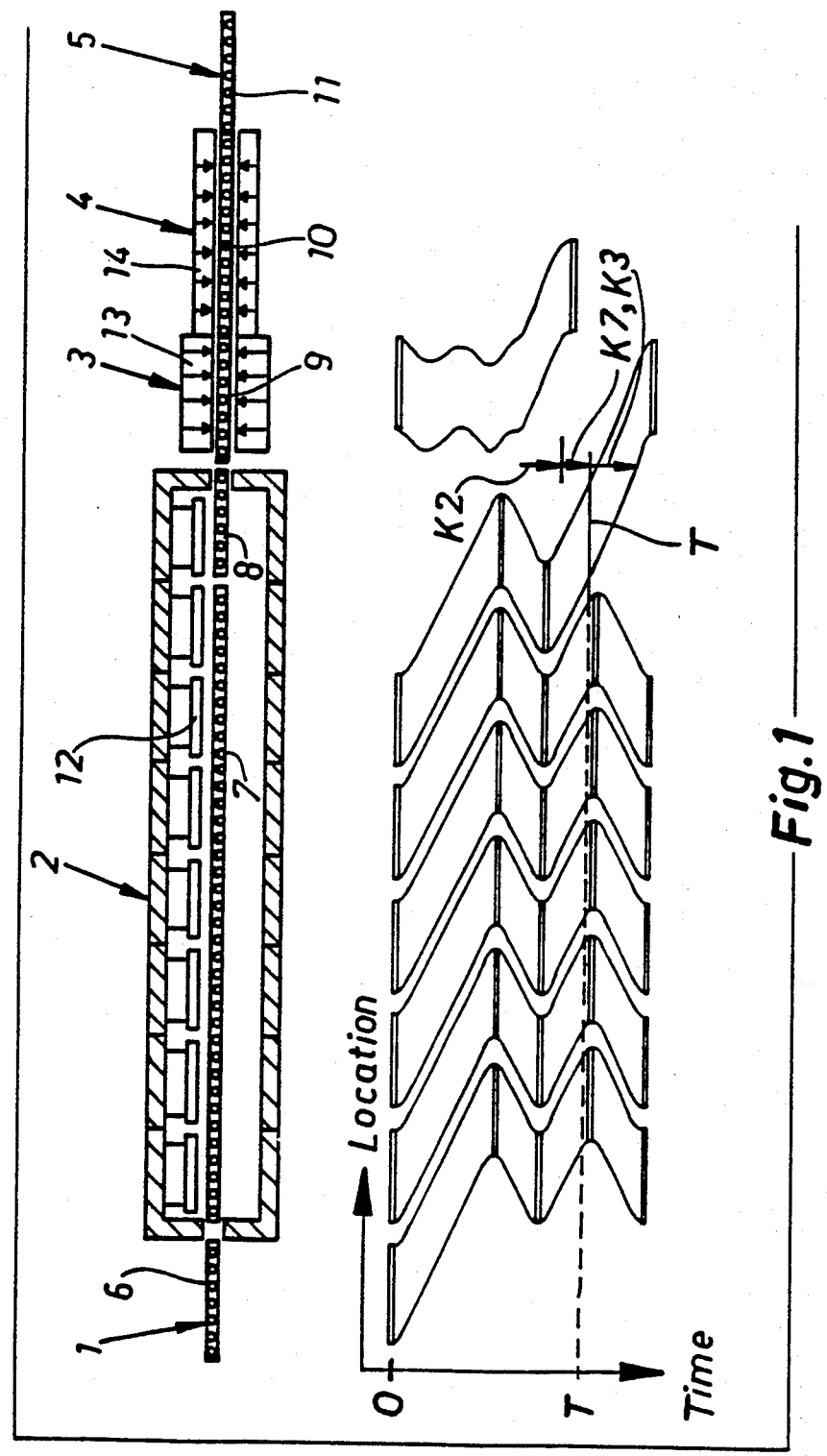
Figure 2:
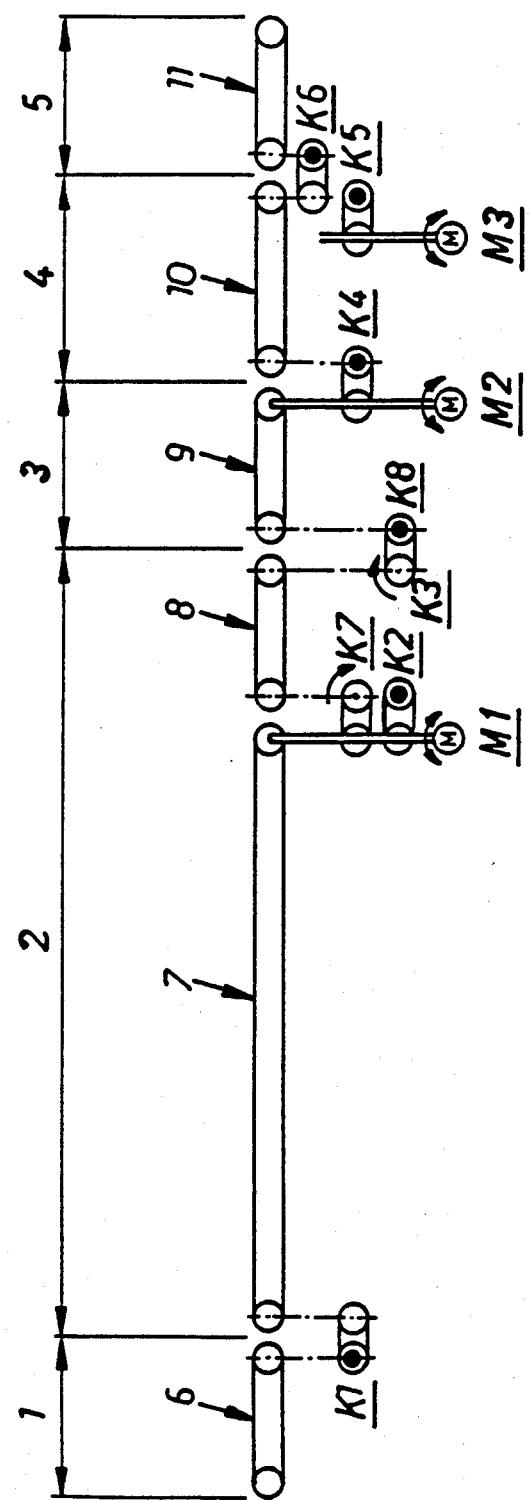
FIG. 2 is a diagrammtic view of the conveyors in such apparatus and their drive means.

The apparatus includes a loading section 1, a heating furnace 2, a tempering section 3, an annealing section 4 and an unloading section 5. Each section and the heating furnace are provided with conveyors consisting of horizontal rollers that are transverse to the traveling direction, namely a loading section conveyor 6, a furnace conveyor 7, an intermediate conveyor 8 towards the downstream end of said furnace, a tempering section conveyor 9, an annealing section conveyor 10 and an unloading section conveyor 11.

The furnace is provided with heating resistance 12, the tempering section is provided with chilling-air blower means 13 and the annealing section is provided with less effective chilling-air blower means 14.

Since the structural details of the above components are well-known to a person skilled in the art and also described in the above publications dealing with the prior art, they will not be further expalined in this context.

What is essential in this invention is the way the loads of glass sheets are driven in a heating furnace and how individual loads of glass sheets are carried from a heating furnace into a tempering section. It can be noted that the furnace contains simultaneously several loads of glass sheets, which are very close to each other and which are all at different heating stages, in other words they have arrived in the furnace at different times. The action is based on a continuous operation, with the furnace fully loaded and tempering section 3 simultaneously containing a glass sheet to be tempered.

A motor M1 drives furnace conveyor 7 in an oscillating fashion so that one of the forward-directed oscillating strokes is longer than a return stroke preceding or following it. Carrying the loads of glass sheets forward in the furnace is thus effected gradually and intermittently during these long oscillating strokes.

A motor M2 drives tempering section conveyor 9 in an oscillating fashion so that a load of glass sheets reciprocates in the tempering section the same distance forward and backward.

A motor M3 drives annealing section conveyor 10 also in an oscillating fashion.

The loading section conveyor 6 connects with an openable and closeable magnetic switch K1 to the furnace conveyor 7. The unloading section conveyor 5 connects with a switch K6 to the annealing section conveyor 10, which in turn is connected to a motor M3 by way of a switch K5. The tempering section conveyor 9 is directly connected to a motor M2. The annealing section conveyor 10 is connected to motor M2 by way of a switch K4. In addition, said tempering section conveyor 9 is connected to intermediate conveyor 8 by way of an open-close switch K8 and its associated one-way transmission means K3 in a manner that, when switch K8 is closed, said intermediate conveyor 8 travels along with conveyor 9 only forward in advancing direction. Intermediate conveyor 8 is also connected to furnace conveyor 7 with a one-way transmission means K7 which has the same advancing direction as said one-way transmission means K3. Intermediate conveyor 8 can be connected to furnace conveyor 7 also by means of a conventional two-way open-close switch K2.

The following describes the operation from the situation where glass sheets are at a zero point marked on the time axis. Next, all glass sheets on furnace conveyor 7 perform a long stroke forward. As a result, the foremost glass sheet on the furnace conveyor moves over onto intermediate conveyor 8, which is mechanically coupled with furnace conveyor 7 by means of switch K2. The glass sheet lying on loading section conveyor 6 moves onto furnace conveyor 7, which is mechanically coupled with conveyor 6 by means of switch K1. Each glass sheet refers to one independent load of glass sheets, possibly containing a plurality of glass sheets. However, they differ from other loads of glass sheets in the sense that they are at different stages of heating, having arrived in the furnace at different times. When this long oscillating stroke is over, switch K1 is opened and furnace conveyor 7 performs a short return stroke whose length is at least such that the trailing edge of the foremost glass in the furnace reaches the boundary between conveyors 8 and 7. However, a return stroke is typically such that the trailing edge of a glass last loaded in the furnace travels to the inlet end wall of a furnace chamber. Thereafter, furnace conveyor 7 effects a stroke forward. At the beginning of or during this forward-directed stroke said switch K2 is opened, whereby furnace conveyor 7 can only drive intermediate conveyor 8 forward through said one-way transmission means K7.

Before the trailing edge of a leading glass sheet advancing in the furnace crosses the boundary between conveyors 7 and 8, a switch K8 along with its one-way transmission means K3 is coupled on, whereby the tempering section conveyor 9 can only drive intermediate conveyor 8 forward. Prior to that, a glass sheet previously in tempering section 3 has been advanced into annealing section 4. Thus, intermediate conveyor 8 is connected simultaneously both to furnace conveyor 7 and to tempering section conveyor 9 through unidirectionally acting one-way transmission means K7 and K3, said intermediate conveyor 8 traveling forward at the speed of the one of conveyors 7 or 9 that has a higher speed.

At this stage said tempering section conveyor 9 is set to forward traveling speed slower than the traveling speed of furnace conveyor 7, said intermediate conveyor 8 carrying a glass sheet at the same speed as furnace section conveyor 7.

When the forward-directed speed of furnace conveyor 7 decelerates prior to its reversal to a return stroke and as the speed of the tempering section conveyor is further accelerated at the same time, at a certain moment T the speed of tempering section conveyor 9 exceeds the speed of furnace conveyor 7, the drive of intermediate conveyor 8 being transferred from one-way transmission means K7 over to one-way transmission means K3. Hence, a load of glass sheets on intermediate conveyor 8 continues its movement onto tempering section conveyor 9 while at the same time the loads of glass sheets on furnace conveyor 7 reverse to a return stroke. When a load of glass sheets arriving on conveyor 9 lies completey upon said conveyor 9, switch K8 opens and when the return stroke of furnace conveyor 7 is completed, the situation corresponds to time 0 and a new operating cycle can begin.

Switch K2 re-closes during the forward movement of furnace conveyor 7 following the 0-moment, whereby the return movement of intermediate conveyor 8 is possible.

Tempering of a load of glass sheets oscillatd on tempering section conveyor 9 occurs at the same time as furnace conveyor 7 effects a long advancing stroke forward. During the short return stroke and the following forward stroke of furnace conveyor 7, the load of glass sheets leaves tempering section conveyor 9 arriving on annealing section conveyor 10, so that said tempering section conveyor 9 is ready to receive another load of glass sheets.

The above arrangement makes it possible to combine the capacities of a furnace and a tempering section for the maximal utilization of them both despite the fact that the heating time required byeach individual load of glass sheets is many times longer than tempering time. In other words, the transit speed of individual loads of glass sheets in a furnace can be arranged so that their residence time in a furnace divided with the number of glass sheet loads matches the tempering time or slightly exceeds the tempering time.

The method and apparatus of the invention are suitable for the production of both flat and bent tempered glasses. In the production of bent glass sheets, it is particularly preferable to employ such a bending and tempering section which is set forth in the applicants' co-pending application Ser. No. 836,826. Thus, one and the same apparatus can be optionally used to produce either flat glass sheets or bent glass sheets, whose radius of curvature can be chosen as desired.

In the production of bent glass sheets, the residence time of glass sheets in a combined bending and tempering section becomes longer. However, the time spent for bending and tempering is still many times shorter than heating time, so according to the above-described principle, it is preferable to combine the semi-continuous forwarding occurring in a furnace and the oscillation occurring in a tempering section.

The advancement of tempered glass sheets from tempering section 3 into annealing section 4 and further into unloading section 5 is effected as follows.

The oscillation on the conveyor 9 of tempering section 3 is controlled in a manner that at the outset of a transfer stage the glass sheet has traveled to the end of tempering section 3 next to annealing section conveyor 10 and stops there for a while.

Simultaneously, the oscillation of one or more, typically two loads of glass sheets on the conveyor 10 of annealing section 4 is controlled in a manner that at the outset of a transfer stage the load of glass sheets has traveled to the end of annealing section 4 next to tempering conveyor 9 and stops there for a while. Thus, at the outset of a long forward stroke, the distance between glass sheets lying on different conveyors 9 and 10 is as short as possible.

At this moment, switch K5 connecting annealing conveyor 10 to drive motor M3 is opened and switch K4 connecting annealing conveyor 10 to tempering section drive motor M2 is closed. Closed at the same time is switch K6, which connects unloading section conveyor 11 to annealing section conveyor 10. Thus, conveyors 9, 10 and 11 operate together, driven by tempering section motor M2.

The drive motor M2 for tempering section conveyor 9 effects a forwarding stroke whose length is such that a glass sheet previously on tempering section conveyor 9 moves over to the end of annealing section conveyor 10 next to the tempering section. After the forwarding stroke is completed, switch K4 is opened and switch K5 is closed, followed by another forwarding stroke by drive motor M3 for annealing section conveyor 10 in a manner that the leading glass sheet previously on annealing section conveyor 10, which glass sheet moved only partially onto unloading conveyor 11 during the first forwarding stroke effected by means of drive motor M2, shifts completely onto said unloading conveyor 11.

Another embodiment is to define the length of said first forwarding stroke to be such that the glass sheets on both tempering section conveyor 9 and on annealing section conveyor 10 travel into the following sections and the stroke length of determined by that glass sheet whose shift requires a longer stroke. However, this embodiment spends more of the transfer time used by the motor of tempering section conveyor 10, which in some cases results in a decrease of tempering capacity since the total time required for carrying a glass sheet into tempering section 3, (bending) tempering and for carrying it from tempering section 3 into annealing section 4 is critical in view of the highest possible capacity.

Both embodiments are capable of ensuring that the distance between the loads of glass sheets in annealing section 4 is as short as possible.

When a glass sheet has completely shifted onto unloading conveyor 11 and the conveyor oscillating motions begin in annealing section 4, switch K6 is opened at the dead point where conveyor 10 reverses for a return stroke, whereby said annealing section conveyor 4 is capable of totally independent operation. Conveyor 10 is oscillated slowly during the time between forwarding strokes and, finally, care is taken that the glass sheet(s) lying on conveyor 10 is at the outset of the following forwarding stroke stationary in a proper position at the end of annealing section conveyor 10 adjacent to tempering section 3, as indicated above.

Figure 3:
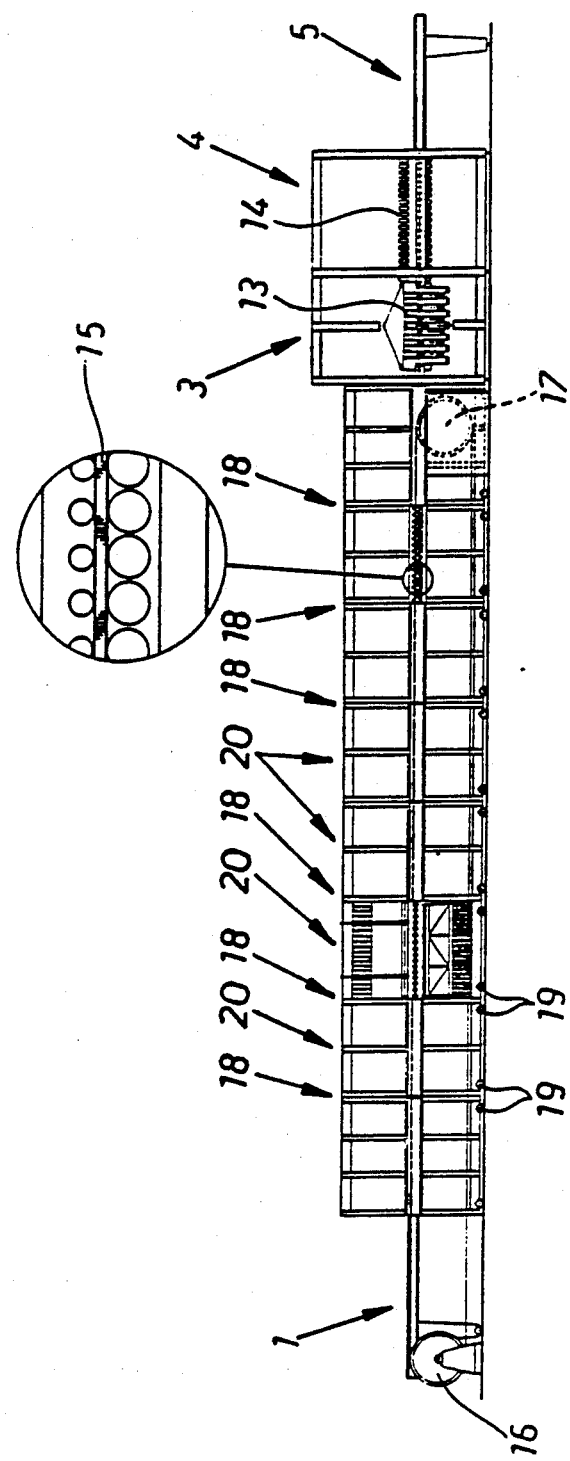
FIG. 3 is a side view and partially cut-away view of the general design of a furnace section of such apparatus.
Figure 4:
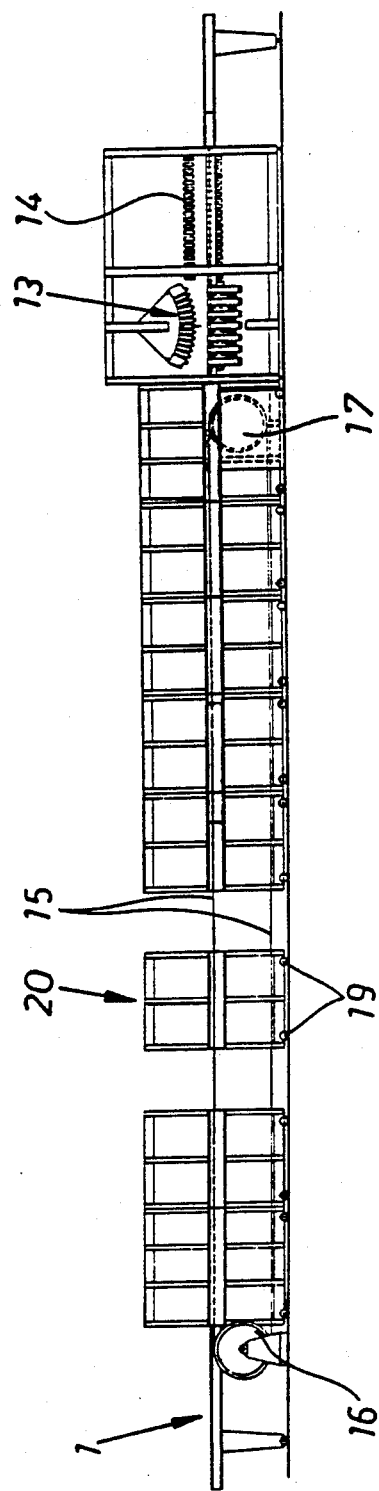
FIG. 4 shows the same as FIG. 3 but with the furnace opened.

FIGS. 3 and 4 depict the division of a furnace into longitudinally separate sections 20 according to the invention. The vertical boundaries between sections 20 are designated with reference numeral 18. Any one of the sections 20 can be separated from other sections simply by shifting the forward end sections of a furnace, located upstream of the section 20 to be separated, longitudinally of a furnace in the direction opposite to the glass sheets forwarding direction, as shown in FIG. 4. At the same time, loading section 1 is also shifted. For this shift or transfer, each furnace section 20 is supported on its base, e.g. tracks running lengthwise of a furnace, by means of wheels 19.

The drive of the rollers of furnace conveyor 7 is also arranged so as not prevent the separation of sections 20. The first ends of the rollers of conveyor 7 project out of one side of the furnace and are fitted with pulleys, against which the press wheels squeeze a steel belt 15 trained as an endless loop over reversing wheels 16 and 17.

One 16 of the reversing wheels is positioned sufficiently far from the upstream end of a furnace (FIG. 3), so that the furnace sections positioned upstream (left in the figure) of a section to be separated are capable of shifting a sufficient distance in order to provide a sufficient maintenance space on either side of section 20 to be separated (FIG. 4). The open ends of the furnace sections on either side of a separated section can be sealed with a thermal insulation for the time required for the maintenance of separated section 20, e.g. for the replacement of resistances. A separated section 20 cools rapidly and, as soon as maintenance work is finished and the furnace sections re-assembled into a continuous furnace, the furnace temperature can be run up quickly since only the separated section cooled sufficiently for carrying out the maintenance work. This increases essentially the production capacity of an entire apparatus since the production downtimes required for maintenance will be short.

Another advantage gained by sectioning a furnace according to the invention is that the customer can choose the length of a furnace according to desired production capacity and, with production capacity increasing, the length of a furnace can be increased until the maximum capacity is reached as determined by the tempering section throughput.

We claim:

1. A method of carrying glass sheets during heating and tempering, characterized in that:

during heating, glass sheets are oscillated in a furnace back and forth so that the distance traveled forward on at least some of the strokes is longer than the distance traveled backwards, whereby the transport of each load of glass sheets from the up-stream end of a furnace to the downstream end of a furnace is effected by means of the combined effect of several forward-directed long strokes, that during tempering, which follows heating, the same glass sheets are oscillated back and forth in a tempering section with forward and backward strokes of substantially equal length, and that shifting of a load of glass sheets from furnace into tempering section is effected by extending the forward-directed stroke of a load of glass sheets at the downstream end of said furnace while at the same time other loads of glass sheets in the furnace reverse for a backward-directed stroke.

2. A method as set forth in claim 1, characterized in that during tempering, as a glass sheet to be tempered is oscillated in a tempering section, a furnace conveyor is controlled so as to perform a long forwarding stroke, whereby a fresh load moves from loading section into furnace, a batch of glass sheet loads in the furnace consisting of several loads of glass sheets at different stages of heating travels forward over a distance corresponding to the space between individual loads and a load first at the downstream end of the furnace moves onto an intermediate conveyor at the downstream end of said furnace.

3. A tempering apparatus for glass sheets, comprising a loading section (1), a heating furnace (2), a tempering section (3), an annealing section (4) and an unloading section (5), roller conveyors (6–11) consisting of horizontal rollers extending transverse to the traveling direction for carrying loads of glass sheets from loading section (1) into unloading section (5) through heating furnace (2), tempering section (3) and annealing section (4), a first drive motor (M1) for driving a furnace roller conveyor (7) and a second drive motor (M2), adapted to drive a bending and tempering section roller conveyor (9) in a manner that, during a tempering step, the rollers rotate back and forth over substantially the same rotating distance in both directions, and after said tempering, the rollers rotate continuously in the same direction for carrying a tempered glass sheet into the annealing section, characterized in that said first drive motor (M1) is adapted to rotate the furnace rollers first in one direction over a certain number of rotations and then in the other direction over a substantially larger number of rotations for moving each load of glass sheets at a given heating stage only over a small part of the total furnace length so as to move a load of glass sheets stepwise forward in the furnace, and that the downstream of said furnace, in conveying direction after the actual furnace conveyor (7), is provided with a separate intermediate conveyor (8), during whose first operating cycle said intermediate conveyor (8) is coupled to travel along with furnace conveyor (7) and during whose second operating cycle said intermediate conveyor is adapted to travel forward in conveying direction for carrying a load of glass sheets from furnace (2) into tempering section (3) while at the same time said furnace conveyor (7) stops and reverses for a return stroke.

4. A tempering apparatus as set forth in claim 3, characterized in that said intermediate conveyor (8) is without its own drive motor connectable by means of a first switch (K2) to be driven back and forth along with the actual furnace conveyor (7) and is further coupled by means of a first one-way transmission means (K7) to be driven along with furnace conveyor (7), said intermediate conveyor traveling with the furnace conveyor only in one direction when first switch (K2) is in open condition, and at the same time, said intermediate conveyor is by means of a second switch (K8) and its associated second oneway transmission means (K3) connectable to be driven along with said tempering section conveyor (9) only in one direction, whereby the shift of the drive of intermediate conveyor (8) from the drive mechanism (M1, K7) of furnace conveyor (7) to the drive mechanism (M2, K8, K3) of tempering section conveyor (9) occurs after the forward speed of tempering section conveyor (9) exceeds the forward speed of furnace conveyor (7) just before the furnace conveyor stops and reverses.

* * * * *